United States Patent [19]

Nakamura

[11] 4,067,051
[45] Jan. 3, 1978

[54] CARTRIDGE TYPE MAGNETIC RECORDING AND REPRODUCING SYSTEM

[75] Inventor: Yuji Nakamura, Neyagawa, Japan

[73] Assignee: Matsushita Electric Industrial Co., Ltd., Kadoma, Japan

[21] Appl. No.: 700,497

[22] Filed: June 28, 1976

[51] Int. Cl.$^2$ .................... G11B 15/66; G11B 15/18
[52] U.S. Cl. ........................................ 360/95; 360/71
[58] Field of Search ...................... 360/95, 85, 71, 96

[56] References Cited

U.S. PATENT DOCUMENTS

| | | | |
|---|---|---|---|
| 3,638,953 | 2/1972 | Kodama et al. | 360/74 |
| 3,730,613 | 5/1973 | Neff | 226/113 |
| 3,740,492 | 6/1973 | Inaga | 360/85 |
| 3,825,944 | 7/1974 | Terao et al. | 360/85 |
| 3,902,680 | 9/1975 | Neff | 360/85 |
| 3,964,096 | 6/1976 | Matsuyama | 360/85 |

Primary Examiner—Robert S. Tupper
Attorney, Agent, or Firm—Stevens, Davis, Miller & Mosher

[57] ABSTRACT

Cartridge type magnetic recording and reproducing system comprises a magnetic transducer head which is arranged externally of a cartridge when the cartridge has been loaded, tape withdrawal means for drawing a length of tape from the cartridge for pressing it against the magnetic transducer head during recording and reproducing operations, a take-up motor for rotating one of two reel mounts to take-up tape slack into the cartridge when the press contact of the transducer head with the tape is released, and brake means for applying a brake force to the other reel mount.

2 Claims, 8 Drawing Figures

CARTRIDGE TYPE MAGNETIC RECORDING AND REPRODUCING SYSTEM

The present invention relates to a magnetic recording and reproducing system which employs a tape cartridge in which a magnetic tape is accomodated and performs recording and reproducing operations while a length of the tape is drawn out of the cartridge.

In the magnetic recording and reproducing system in which recording and reproducing operations are performed while a length of the magnetic tape is drawn out of the cartridge, it has been the general practice to draw a length of the tape out of the cartridge in response to the recording and reproducing operations to cause the tape against be pressed to a capstan so that the tape is moved by a pinch roller, and to restore only the pinch roller to its original position in response to the stop operation. In such a type of prior art system, slack is created in the magnetic tape when the system is changed from the recording/reproducing operation to the stop condition. If the recording/reproducing operation is restarted from the stop condition, the slack increases resulting in disengagement of the tape or damage to the tape, both preventing smooth running of the tape. Furthermore, when the cartridge is to be unloaded after the recording/reproducing operation has been performed and the system has been stopped, the cartridge must be carefully unloaded taking the tape slack of the tape into consideration. Otherwise the tape might be broken or deformed, causing it to become unusable.

It is, therefore, an object of the present invention to prevent the occurrence of substantial slack of the magnetic tape due to the shift from the recording/reproducing state to the stop state and the further shift from the stop state to the recording/reproducing state so that no positional shift of the tape and no disengagement or break of the tape occur even if the recording/reproducing operation and the stop operation are repeated alternately, and to facilitate unloading of the cartridge in a simple manner without damaging the tape.

In accordance with the present invention, the cartridge type magnetic recording and reproducing system is so constructed that when a length of the tape accommodated in the cartridge has been drawn out and then the tape has been accommodated in the cartridge and again drawn out, the relative position between the tape and the head remains unchanged. Consequently, a tape counter used in conjunction with the system will not show an indication error and occurence a of non-recorded area during re-recording is avoided. Furthermore, because the cartridge is unloaded after the tape portion has been completely accommodated in the cartridge, damage to the tape and the system can be prevented.

These and other objects, features and advantages of the present invention will be apparent from the following detailed description of the preferred embodiment of the invention when taken in conjunction with the accompanying drawings, in which.

Figure 2:
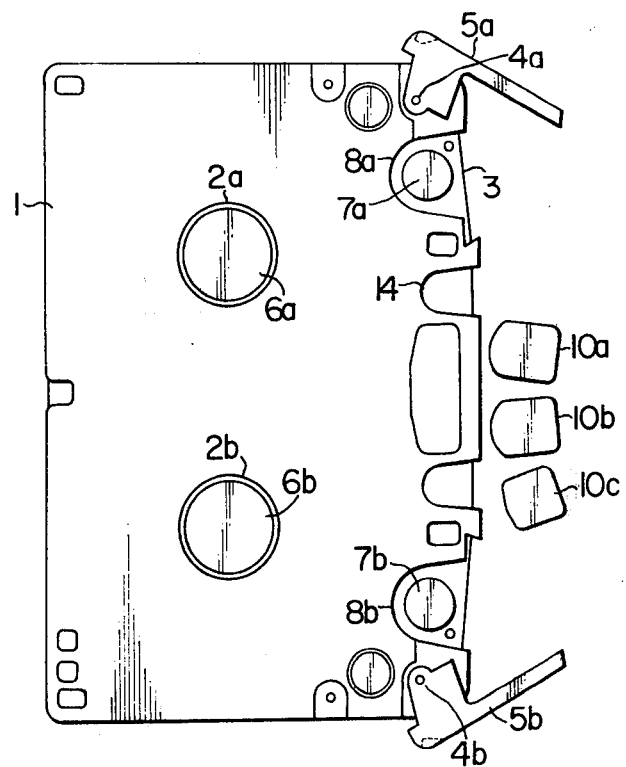
FIG. 2 is a schematic plan view of the same system in its non-recording/reproducing state.

One embodiment of the present invention will now be explained with reference to the drawings. A cartridge body 1 accommodates a magnetic tape 3 mounted on reel hubs 2a and 2b. At front opposite ends of the cartridge body 1, lids 5a and 5b are pivotably mounted around pins 4a and 4b. The lids 5a and 5b are normally biased by springs (not shown) in the direction to close the front side of the cartridge body 1. The reel hubs 2a and 2b are mounted on reel mounts 6a and 6b which are rotatably mounted on the apparatus. Pinch rollers 7a and 7b are positioned in cutout recesses 8a and 8b formed in the front side of the cartridge body 1, as shown in FIG. 2, in the non-recording/reproducing state, and are moved outwardly of the cutout recesses 8a and 8b during the recording/reproducing operation so that they are pressed against capstans 9a and 9b with the tape 3 interleaved therebetween.

Figure 1:
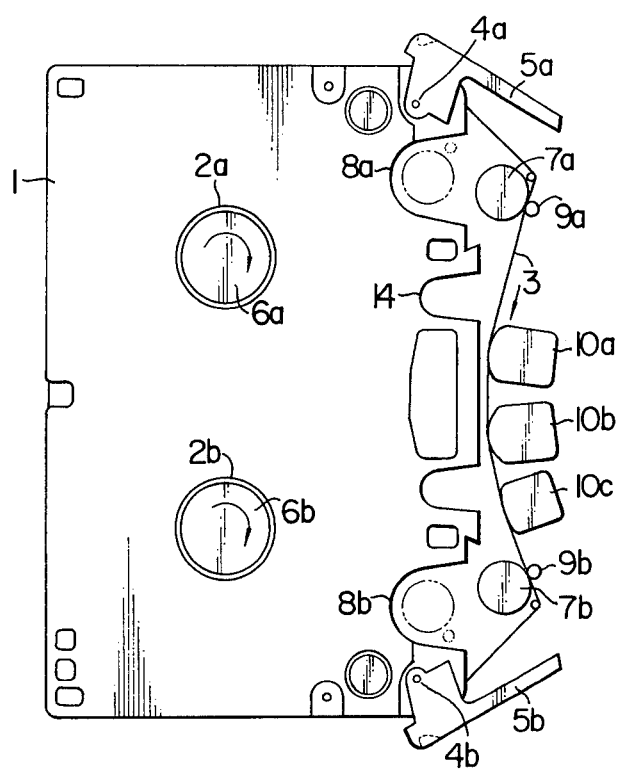
FIG. 1 is a schematic plan view of one embodiment of the present system in its recording/reproducing state.
Figure 3:
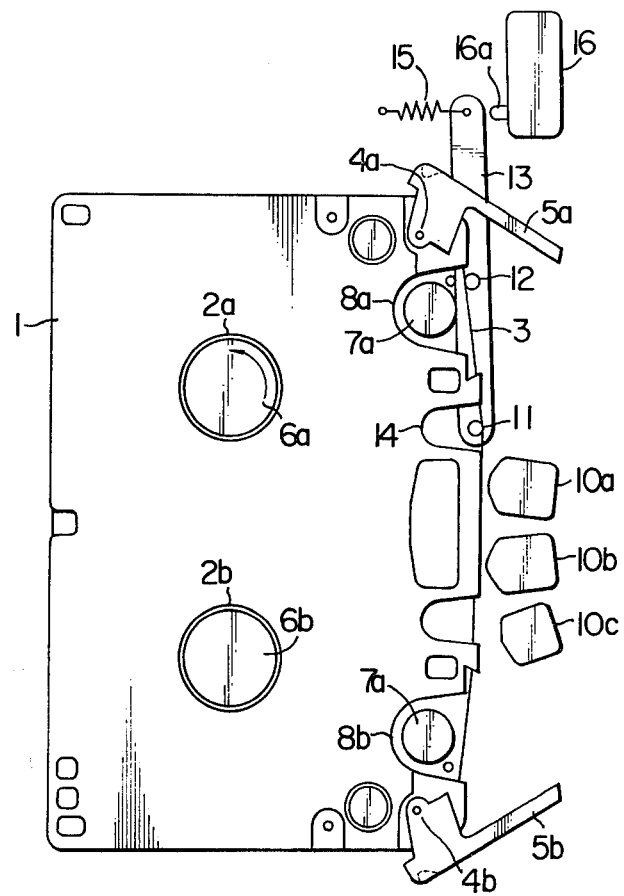
FIGS. 3 and 4 illustrate operation of the tape run detection mechanism of the system.

An erasing head 10a, a recording head 10b and a reproducing head 10c are contacted by the magnetic tape 3, as shown in FIG. 1, in the recording/reproducing state. A tape run sensing pin 11 is mounted at one end of a sensing lever 13 which is pivotable around a shaft 12. The sensing pin 11 which is shown in FIG. 3 is inserted into a cutout recess 14 formed in the front side of the cartridge body 1 when the cartridge is loaded, and it is abutted against a portion of the tape 3 which spans across an open end of the cutout recess 14 by a tension spring 15 mounted at the other end of the sensing lever 13 in a manner to cause the sensing lever 13 to pivot couterclockwise. A tape run sensing switch 16 has its switch button 16a pressed against the other end of the sensing lever 13 when the tape 3 is stretched without substantial slack.

A take-up motor 17 (FIG. 5) rotates the reel mount 6a in the direction to take-up the tape 3 into the cartridge body 1. A brake lever 18 is pivotable around a shaft 19, a brake spring 20 is mounted at one end thereof to cause the lever 18 to pivot counterclockwise, and a brake release plunger 21 is mounted at the other end. A brake member 22 is mounted on the brake lever 18 so that when it is energized by the brake spring 20 it applies a brake force to the reel mount 6b. When the plunger 21 is attracted, the brake to the reel mount 6b is released. A cartridge housing 23 (FIGS. 6 and 7) is formed in the apparatus body, and an eject plunger 24 is mounted at a rear bottom of the housing 23. A shaft 25 is horizontally supported in a slot 23a formed at the bottom of the cartridge housing 23, and an L-shaped, eject lever 26 is pivotably mounted on the shaft 25. One end of the eject lever 26 is coupled to the plunger 24 through a connecting rod 27 so that when the plunger 24 is actuated to pull the connecting rod 27, the other end of the lever 26 push the cartridge body 1 upwardly for ejecting the same.

Figure 8:
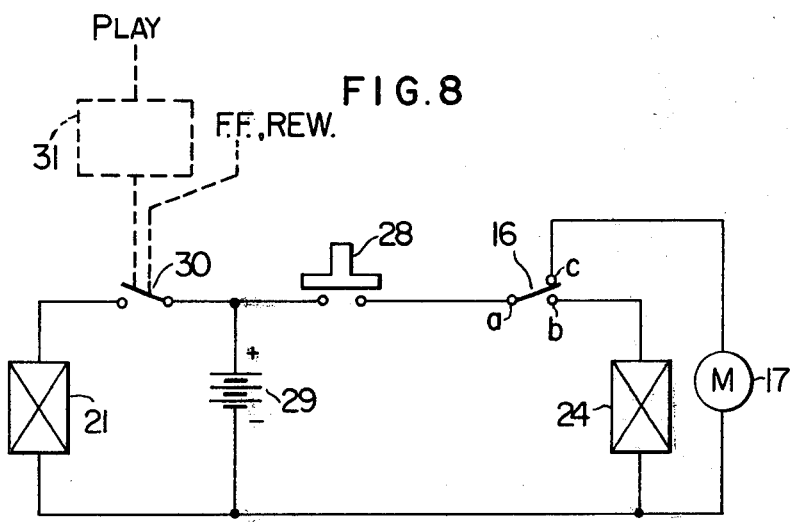
FIG. 8 is a circuit diagram of the system.

A cartridge ejection push button switch 28 is electrically connected with the tape run sensing switch 16, the take-up motor 17 and an ejection plunger 24 in the manner shown in FIG. 8. In particular, the push button switch 28, a D.C. power supply 29 and the eject plunger 24 are connected in series between a movable contact a and a fixed contact b of the tape run detection switch 16. The take-up motor 17 is connected between a fixed contact c of the switch 16 and a negative terminal of the power supply 29. The switch 16 is normally thrown to the fixed contact c and it is thrown to the fixed contact

Figure 4:
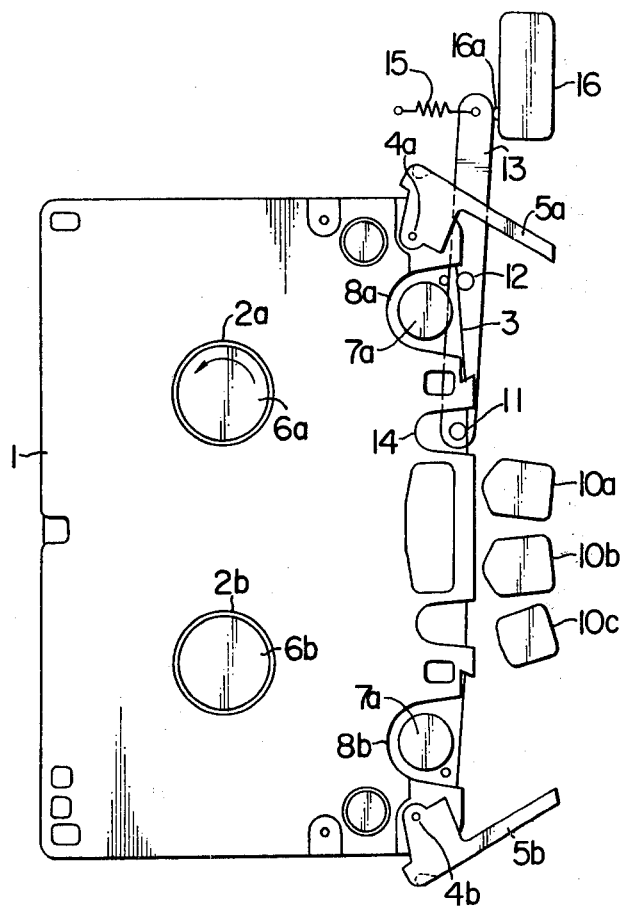

*b* by the pressure afforded by the sensing lever 13, as shown in FIG. 4. The brake release plunger 21 and a switch 30 are connected in series to the power supply 29. The switch 30 is opened only during the stop state and it is closed in response to fast tape feed operations such as fast-forwarding/fast rewinding operations. It is also closed when the tape 3 is drawn out of the cartridge 1 during the recording/reproducing operation and sensing means 31 detects this state.

The lids 5*a* and 5*b* mounted on the cartridge body 1 are normally closed, as stated above, to cover the tape portions over the cutout recesses 8*a* and 8*b* for protection. They are released by means not shown when the cartridge is loaded.

In the present embodiment, during the stop state in which the cartridge is loaded but no operation is performed, the pinch rollers 7*a* and 7*b* are positioned within the cutout recesses 8*a* and 8*b* formed in the front side of the cartridge body 1, as shown in FIGS. 2–4. A brake force is applied to the outer periphery of the reel mount 6*b* because the brake member 22 is urged against mount 66 by the spring 20 since the plunger 21 shown in FIG. 5 is in its non-operation state.

During the recording/reproducing operation, the pinch rollers 7*a* and 7*b* are moved outward of the cutout recesses 8*a* and 8*b* of the cartridge body 1, as shown in FIG. 1, to draw the tape 3 out of the cartridge while allowing only the reel mount 6*a* to rotate and to press the tape against the capstans 9*a* and 9*b*. In this case, the tape 3 is pressed to the front faces of the magnetic transducer heads 10*a* to 10*c*. When this withdrawal of the tape is sensed by sensing means 31, the switch 30 in FIG. 8 is closed so that the plunger 21 shown in FIG. 5 is attracted to release the brake to the reel mount 6*b*, and the capstans 9*a* and 9*b* are driven by means not shown. Thus the tape 3 is driven at a constant velocity in the direction shown by an arrow in FIG. 1, i.e. from the reel mount 6*a* to the reel mount 6*b* for conducting the recording/reproducing operation.

Figure 5:
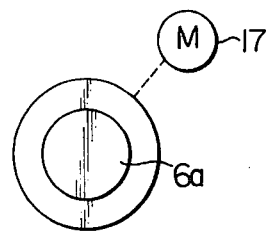
FIG. 5 is a schematic plan view showing the reel mount of the system.
Figure 5:
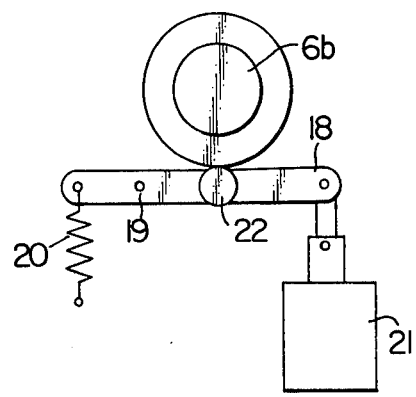
Figure 6:
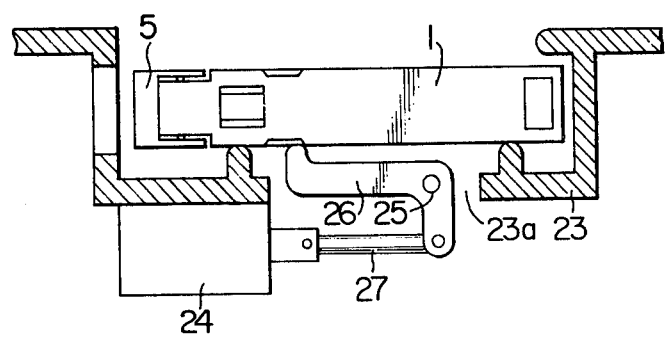
FIGS. 6 and 7 illustrate operation of the cartridge eject mechanism of the system.

When the apparatus is stopped in the recording/reproducing state, the pinch rollers 7*a* and 7*b* are moved back into the cutout recesses 8*a* and 8*b* of the cartridge body 1, and the switch 30 shown in FIG. 8 is opened to block power to the plunger 21 so that the brake member 22 again presses against the outer periphery of the reel mount 6*a*, as shown in FIG. 5, to apply the brake thereto. In this case, since the tape 3 is slack due to the movement of the pinch rollers 7*a* and 7*b*, the sensing lever 13 is pivoted counterclockwise by the spring 15 as shown in FIG 3 so that the switch button 16*a* of the tape run sensing switch 16 is not in the depressed state. Accordingly, in FIG. 8, the movable contact *a* of the sensing switch 16 is thrown to the fixed contact *c*.

When the cartridge ejection push button switch 28 is depressed under this condition, the D.C. power supply 29 is applied to the take-up motor 17 to cause the motor 17 to start rotation. As the motor 17 rotates, the reel mount 6*a* is rotated in the direction of the arrow in FIG. 3, that is, in the direction to take-up the tape 3 into the cartridge body 1 so that the slack of the tape 3 is taken up. When the take-up of the tape 3 is completed, the tape run sensing pin 11 mounted at the one end of the sensing lever 13, as shown in FIG. 4, is pressed toward the closed end of the cutoff recess 14 by the tension of the tape 3, and the sensing lever 13 pivots around the shaft 12 clockwise against the action of the spring 15 until the other end of the lever 13 presses the switch button 16*a* of the tape run sensing switch 16 to actuate the switch 16. As a result, in FIG. 8, the movable contact *a* of the sensing switch 16 is thrown to the fixed contact *b*.

Figure 7:
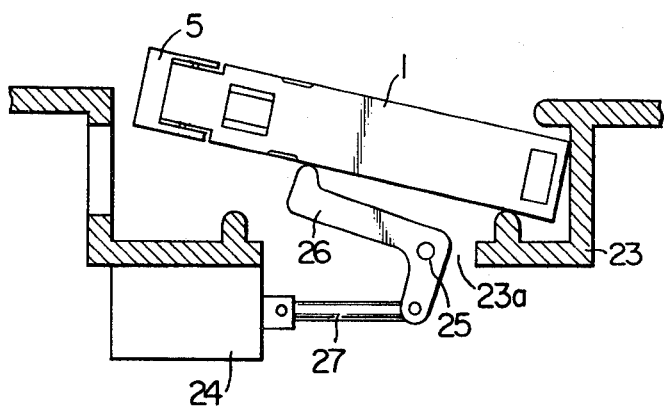

At this time, since the cartridge ejection push button switch 28 is in the depressed state, the power supply 29 is applied to the eject plunger 24, which is then actuated. At the same time, since the feed to the take-up motor 17 is blocked, the rotation of the reel mount 6*a* is stopped. By the attraction of the plunger 24 the eject lever 26 is pivoted clockwise as shown in FIG. 7 and the cartridge body 1 is pushed upward at the end of the lever 26 to allow pick-up of the cartridge. Simultaneously with the push-up of the cartridge body 1, the reel mount 6*a* has a brake force applied thereto by means not shown. During the cartridge ejection, a mechanism, not shown, for opening the lids 5*a* and 5*b* of the cartridge body 1 is not activated and the lids 5*a* and 5*b* are kept in their closed position.

In the apparatus of the above embodiment, when the tape 3 is drawn out of the cartridge body 1 during the recording/reproducing operation and when the slack of the tape 3 is taken up during the cartridge ejection operation, one reel mount 6*b* of the two reel mounts 6*a* and 6*b* has a braking force applied thereto and only the other reel mount 6*a* is allowed to rotate. Therefore, the withdrawal and the take-up of the tape is conducted satisfactorily and the indication error of the tape counter is eliminated. Furthermore, since a braking force is applied to the take-up reel mount 6*b* and the supply reel mount 6*a* is allowed to rotate when the slack of the tape due to the ejection of the cartridge is taken up, the tape is prevented from being taken up on the reel mount 6*b* and at the same time undesired loss of record, which would otherwise occur in the re-recording operation, is prevented. Furthermore, since the sensing means for sensing the tape run senses the slack of the tape when the cartridge is to be ejected, to cause the take-up motor 17 to rotate and when the tape is fully accommodated in the cartridge the sensing means causes the take-up motor 17 to automatically stop, stable and positive tape take-up is assured. In addition, since the take-up motor 17 automatically stops upon the completion of the take-up, tape damage is prevented.

Moreover, since rotation of the motor 17 is stopped upon the completion of the tape take-up and at the same time the plunger 24 is actuated to permit the pick-up of the cartridge, the cartridge is not picked up when the tape is slack and hence damage to the tape and the apparatus is prevented.

While the magnetic recording and reproducing system with the automatic cartridge eject mechanism has been described in the above embodiment, the present invention is also applicable to a system having no automatic eject mechanism. Namely, where the plunger 24 is removed in FIG. 8, the motor 17 rotates when the switch 28 is depressed, to accommodate the tape drawn out of the cartridge body 1 into the cartridge body 1, and when it is fully accommodated, the movable contact *a* of the switch 16 is thrown to the fixed contact *b* to stop the motor 17. In this manner the tape is accommodated without damage.

What is claimed is:

1. A magnetic recording and reproducing system of the type employing a tape cartridge having a magnetic tape wound therein on first and second reel hubs and including means for withdrawing a length of tape from the cartridge and pressing it against a magnetic transducer, wherein the improvement comprises:

first and second rotatable reel mounts having said reel hubs mounted thereon, a take-up motor coupled to said first reel mount, said take-up motor rotating said first reel mount to wind the tape back into the cartridge when the pressure on said tape which holds it against said magnetic transducer is released and the tape becomes slack, braking means for applying a braking force to said second reel mount when said system is not in the recording, reproducing or fast-forward modes, a tape tension increase sensing member for sensing the increase in tape tension when said tape is wound back into said cartridge by said take-up motor, and stopping means for stopping rotation of said first reel mount by said take-up motor when said sensing member senses the increase of tape tension, whereby said tape is accommodated within said cartridge without any slack therein.

2. A cartridge type magnetic recording and reproducing system as claimed in claim 1, wherein said system further comprises a cartridge ejecting means operated when said tape tension increase sensing member senses the increase of tape tension, said cartridge being ejected only when said tape is completely accommodated within the cartridge without any slack therein.

* * * * *